April 15, 1958  F. R. HARRIS  2,830,553
APPARATUS FOR CAREENING FLOATING DRY DOCKS
Filed Feb. 16, 1955  2 Sheets-Sheet 1

INVENTOR
FREDERIC R. HARRIS, deceased,
BY FLORENCE B. DOWNS,
MICHAEL S. LOBENTHAL AND
MONROE PERCY BLOCH,
Executors BY William F. Nickel
ATTORNEY

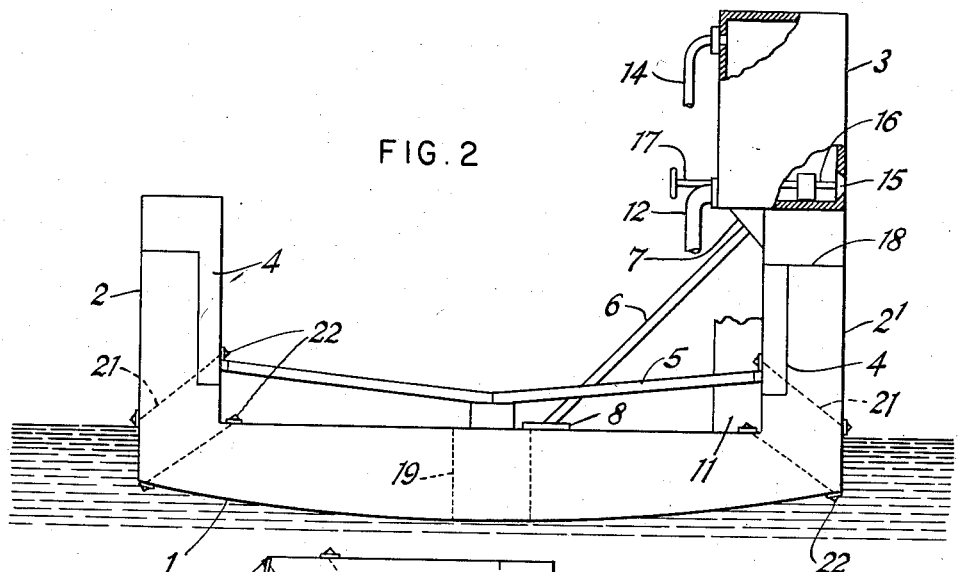
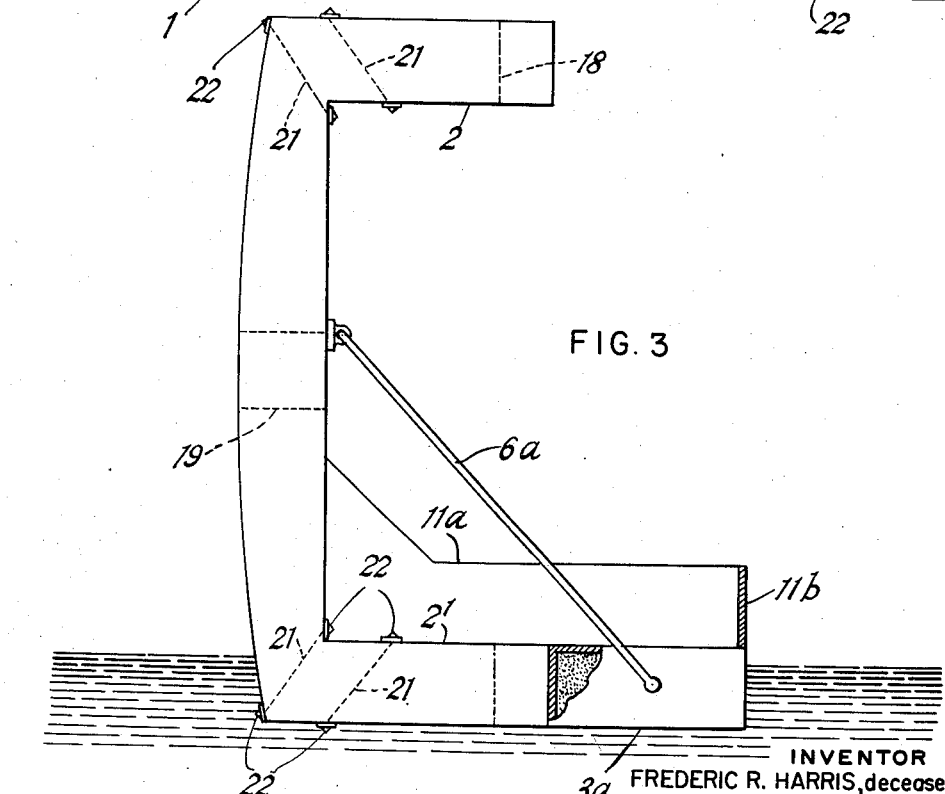

United States Patent Office 2,830,553
Patented Apr. 15, 1958

2,830,553

APPARATUS FOR CAREENING FLOATING DRY DOCKS

Frederic R. Harris, deceased, late of New York, N. Y., by Florence B. Downs, Michael S. Lobenthal, and Monroe Percy Bloch, executors, New York, N. Y., assignors to Frederic R. Harris, Inc., New York, N. Y., a corporation of New York Application February 16, 1955, Serial No. 488,506

3 Claims. (Cl. 114—45)

This invention relates to floating dry docks with pontoon hulls and side walls of less height than the width of the hull, and more particularly to means for navigating or moving such docks through relatively narrow waterways.

An important object of the invention is to provide an extension which can be removably attached to the dock and caused to list the dock and swing the hull thereof sufficiently far away from its regular horizontal position in the water bearing the dock, to permit the passage of the dock through a canal or other channel of less width between its shores or banks than the distance between the outboard faces of the side walls of said dock. The dock then floats with one side wall in the water, and substantially horizontal.

Another object of this invention is to provide a floating dry dock with an extension that is compartmental in structure, adapted to be mounted on top of one side wall, and equipped with suitable connections to fill the compartments or other divisions of said extension with water and afterwards discharge same. Hence, the dock is overweighted along one side, and that side is depressed while the other side is elevated. The dock can thus be careened to the required extent, and afterwards restored to an even keel by expelling the water.

A further object is to provide efficient members for bracing the dock and preventing damage to the structure thereof during the careening and righting operations.

The accompanying drawings show an embodiment of the invention, but in practice many variations in construction may be adopted without deviating from the general design. On said drawings:

Figure 2 is an end view of the dock with the extension attached in its usual position, with the hull substantially horizontal; and Figure 3 is an end view of the dock fully careened, the side wall with attached extension lying horizontally in the water, and the hull being vertical, the dock shown being of a construction somewhat different from what is illustrated in Figures 1 and 2.

The same numerals identify the same parts throughout.

Figure 1:
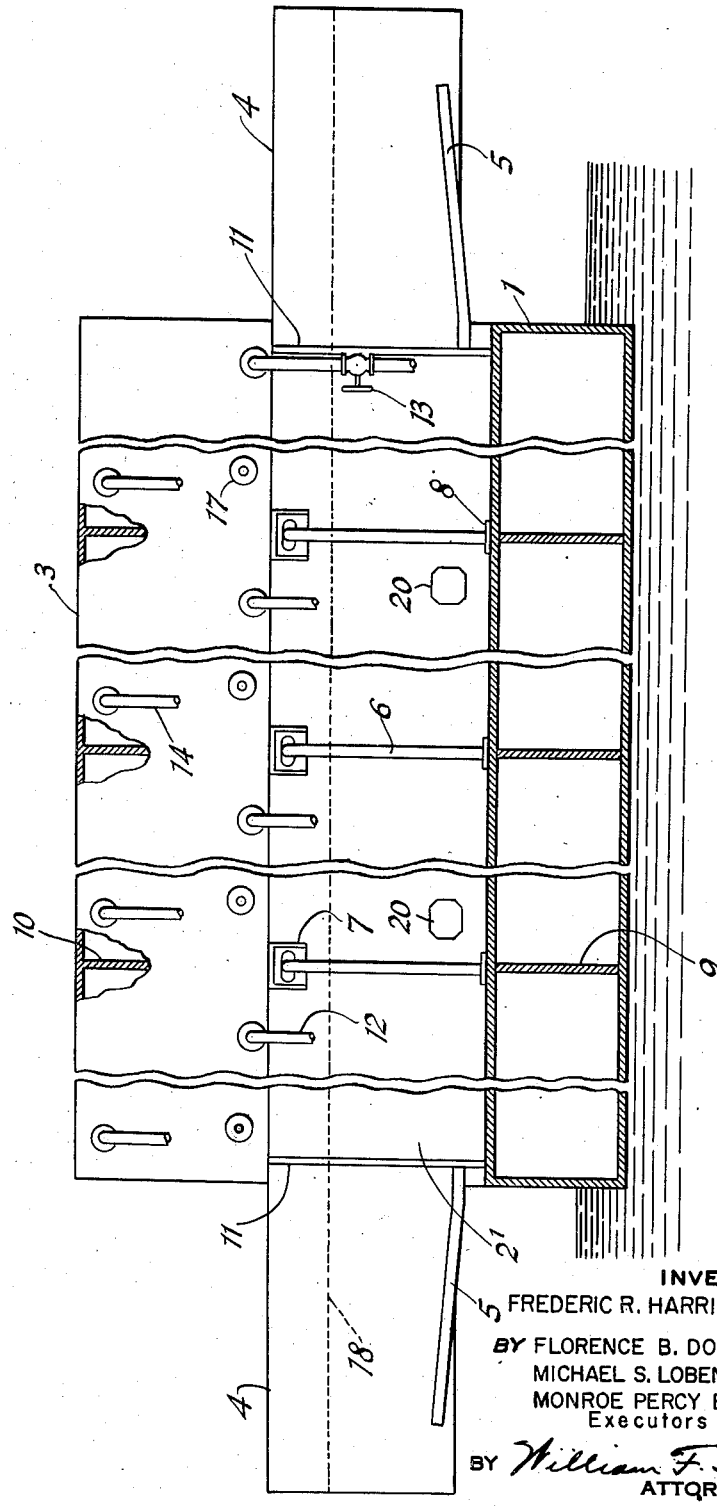
Figure 1 shows a longitudinal section through the pontoon hull the outline of a floating dry dock in its regular position on the surface of a body of water, the extension being mounted on the top of one side wall, the inboard face of the wall and extension being in elevation.

The dock comprises a pontoon hull 1 with walls along the sides, the ends of the dock being open. In its regular operating position, the dock floats upon the water as shown in Figures 1 and 2, with the hull 1 horizontal and the walls 2 and 2' vertical. To move the dock through a canal or other waterway which is narrower than the width of the dock between the outboard faces of the walls, the dock is careened into the position shown in Figure 3, with the hull 1 substantially vertical and the walls horizontal. To gain this end an extension 3 is fixed upon the top of one of the walls 2'. This extension may be compartmental in construction, and extends along substantially the entire length of the top of said wall as indicated in Figure 1. The height of the walls is materially less than the width of the dock. Any suitable means may be used for fastening the extension 3 in place on the wall 2.

The dock for which the extension indicated at 3 is intended is built of steel, or timber, and the side walls as indicated in Figures 2 and 3 have terminal projections 4. The dock herein described may be of the design set forth in prior Patent No. 2,325,607, granted August 3, 1943, and made in three parts. The central part comprises the hull 1 with walls and projections 4; and the end parts, which are not shown herein, are arranged for alignment with the central part, the end parts in position being overlapped by projections 4. Obviously, however, the invention in this case can be employed to careen any floating dock of the usual construction which is of unitary design, i. e., built in one piece or part instead of three. With the construction herein illustrated, however, the extension is needed for the center part only because the end parts of the three-piece dock of the patent aforesaid are much shorter than the length of the hull 1 and its walls, and can easily be turned sidewise and moved through a narrow waterway without tilting or careening.

To reinforce and strengthen the dock and enable it to withstand any unusual stresses to which it is subjected when it is careened into the position shown in Figure 3, bracing members 5 are connected to the hull 1 and to the inboard faces of the projections 4 of both side walls at the ends of the dock. The wall 2' carrying the extension 3 is also strengthened by diagonal bracing beams 6 secured to anchor caps 7 affixed to the upper end of the wall 2' at one end, and to other anchor plates 8 attached to the deck of the hull 1 of the dock. The extension projects over the inboard face of the wall 2', and the caps 7, which are angular, are in the corner thus formed and secured to both the wall 2' and extension 3.

The pontoon hull is shown with a number of transverse bulkheads 9 which extend at each side up into the side walls as far as the safety decks 18 therein. At the middle of the hull is the watertight buoyancy chamber 19, enclosed between longitudinal bulkheads, to which the cross-bulkheads 9 are joined. Compartments are thus formed at each side of the chamber 19. The extension 3 may be divided by similar bulkheads or partitions 10 into compartments or cells, the bulkheads 10 being in the same place as the bulkheads 9. At each end of the side wall 2' an outside bulkhead 11 is constructed, reaching from the deck of the pontoon 1 to the extension 3. When the dock is careened so that the wall 2' and the extension 3 are horizontal and on the surface of the water, the bulkheads 11 will prevent the inboard face of the wall 2' from going awash. The vertical edge of the bulkhead 11, when the dock is not careened, as in Figure 2, is flush with the inboard face of the extension 3.

Inlet pipes 12 are connected to each of the compartments of the extension 3 and each of these pipes may have a control valve, one of which is shown at 13. These pipes are connected to the pumps of the dock or to a portable pump on the deck of the pontoon 1 to fill the extension 3 with liquid ballast such as water. Each of the compartments of the extension 3 also has air conduit connections 14 through which compressed air can be admitted to expel the water from the extension 3. The extension 3 also has in each compartment an outlet valve 15 operated by a rod or stem 16 which is operated by a knob 17 on the outside of the extension. The valves and pipe connections for the extension can be in any convenient position. When the extension 3 is filled with water through the conduits 12 the air pipes 14 serve as air vents and are at this time disconnected from the source of compressed air. After the dock has been careened and it is desired to return it to regular position, the valves 15 are opened and compressed air admitted through the pipes 14 to discharge the water from the extension 3. The conduits 12 and 14 may be connected to pump and air reservoir through any practical arrangement of pipes and couplings.

In practice, the dock is further strengthened by reinforcing the bulkheads (not shown) in the wall 2' above the "safety" decks 18 therein. Plates are welded over all openings in said bulkheads and new bulkheads are installed in the wall above the "safety" decks at the ends. The outer top deck of the wall 2' is reinforced by welding new closure plates in all large openings, and is made water-tight by closing up all the small openings. Also to make the pontoon 1 and whole side wall 2' water-tight for the careened position, all scuppers and side wall passages are closed. On the inside of the dock, all equipment, machinery, fittings, furnishings, furniture, tools, supplies, etc., are either removed, or braced, or blocked for 90 degrees of rotation of the dock. Finally, new hatches 20 are made in the inboard face of the walls 2 and 2'.

At the start of the careening operation, water must be supplied to the dock as ballast, and soundings are made beforehand of the water inside the dock, through manholes (not shown) in the deck of the hull 1 near the buoyancy chamber 19 on the side of the hull towards the wall 2'. Then water is admitted to some of the compartments between the chamber 19 and the side of the dock bearing the wall 2'. Water is allowed to enter the same compartments at the start of the righting operation, and soundings are again made: this time by installing a depth gauge in each flooding compartment at a point visible through the new access hatches 20. To measure the drafts at various stages, draft marks are put at each end of the dock on the outboard faces of wall 2' and extension 3. An indicator is also installed to measure the list of the dock from zero to 90 degrees.

For careening, all compartments in the dock and all of the compartments of the extension 3 must be empty at first, and then the weight of the extension 3 on the wall 2' will cause the dock to have a slight list. Water is then admitted to the hull 1 on the side of the chamber 19 bearing the wall 2'. The flooding of the required number of compartments between the bulkheads 9 is done by opening the inlet valves thereof, controlled in the usual way through connections on the safety deck 18. Also, portable pumps may be used and water forced through openings in the deck of the hull 1. When sufficient water is in the hull, the compartments of extension 3 are filled all at once, or part at a time, in any required order.

The timber bulkheads 11 are preferably installed after careening, on the horizontal inboard face of the wall 2', as they are needed when the dock is towed in its careened position. These bulkheads are removed before the dock is righted.

After the careened dock has been moved while floating on its side wall 2' and extension 3 through the narrow channel, the bulkheads 11 are taken down and the righting operation commences with the admission of water to the same compartments in the hull, and in the same volume as before. This flooding is done with portable pumps on the inboard face of the side wall 2, delivering through the new hatches 20, or any other suitable openings in the wall 2', or the hull 1. The list is thus reduced from 90 degrees to about 68 degrees. The air hose lines are now coupled to the pipes 14 and the valves 15 opened. The air forces all the water out of the extension and the dock slowly settles back to normal position shown in Figure 2.

In the dock shown on Figure 3, the extension 3a is a hollow receptacle mounted on the wall 2' and of the same length and thickness as the latter. It is adapted to be filled with sand to overweight one side of the dock, which in this instance may be all in one piece, of any known design. This extension can be made of either steel or wood. It is secured to the top of the wall 2' in any suitable manner and braced by a number of rods or beams 6a, some of which are attached to the ends of the extension on wall 2'. Along the inboard corners at the ends of the wall 2' are bulkheads 11a connected by a bulkhead 11b along the upper inner edge of the inboard face of the extension to make a continuous gunwale and keep the inboard faces of the wall 2' and the extension 3a clear of water when the dock is fully careened as shown on Figure 3. Other reinforcing means, besides the beams 6a, may be employed.

With this type of dock, water is admitted as before into some of the compartments in the hull on the side bearing the wall 2' between the partitions 9 at the start of the careening operation; and the inboard face of the extension 3 will be open or partly open to give access to the interior. The sand can be carried upon the dock in buckets or bags and up ladders or gangplanks having hand rails and steps on the shoulders of workmen and deposited inside the extension. For this purpose a platform or gangway can be installed on the deck near the wall 2' with means for tilting the platform about its longitudinal axis to keep it level. As the careening proceeds the ladders or the like will become more and more nearly horizontal. Thus, bags of sand can be transferred from a barge at one end of the dock, and piled up on the floor and against the outer wall of the extension 3a. The open inboard face of the extension 3a can be closed wholly or partly with planks or metal plates, as it is filled, if desired. After careening, the sand is removed from the extension 3a to allow the dock to be tilted back to normal position in the same manner as the dock of Figures 1 and 2.

The wall 2' bearing the extension is preferably braced by tension rods 21, the upper ones of which extends at an incline from the outboard face at the level of the deck of the hull 1 to the inboard face at a suitable point with reference to the inside framing, which is not shown. The lower tension rods extend from the deck near the side wall through the hull to the corner of the bottom. Suitable plates 22 bear against the outer faces of the dock and each has a bearing through which the ends of the rods pass. These bearings are at such an angle that when the rods are made fast with nuts, the plates are held tightly against the outer faces of the dock, although the ends of the bearings engage the nuts squarely. Similar rods can be used for strengthening the wall 2, if desired.

The dock, of course, can be constructed of any suitable material and the method and apparatus will serve to tilt floating dry docks with pontoon and side walls of virtually any design. While water is advantageous for use in a type of dock shown in Figures 1 and 2, it is possible, of course, to employ other ballast material either liquid, solid or semi-solid, such as sand or stone either in large pieces or in a state of division. Similarly, in the dock according to Figure 3 the extension may be filled not only with sand, but with stone, or water, being made leakproof for this purpose, or any other substance suitable for the purpose.

Having described the invention, what is claimed to be new is:

1. Means for careening a floating dry dock having a hull, with deck and side walls, said means comprising a removable hollow extension to be affixed to the top of one of said walls for receiving ballast to overweight said dock along the side bearing said wall, and outside bulkheads mounted upon the inboard face of said wall at the ends thereof, said extension projecting over the inboard face of the wall bearing it and said bulkheads connecting the overlapping portion of the extension to the deck of the dock, said dock having bracing beams secured to said wall and the deck, and tension rods between the inboard and outboard faces of said wall, and between the deck and the hull near the corners of the bottom.

2. Means for careening a floating dry dock having a hull, with deck and side walls, said means comprising a removable hollow extension to be affixed to the top of one of said walls for receiving ballast to overweight said dock along the side bearing said wall, and outside bulkheads mounted upon the inboard face of said wall at the ends thereof, the extension being mounted on the top of the wall bearing it and its inboard face being in the same plane as the inboard face of said wall, and the outside bulkhead extending along the upper inboard edge of said extension and along the inboard faces of said extension and said wall at the ends to the deck of the dock, said dock having bracing beams secured to said wall and the deck, and tension rods between the inboard and outboard faces of said wall, and between the deck and the hull near the corners of the bottom.

3. Means for careening a floating dry dock having a hull, with deck and side walls, said means comprising a removable hollow extension to be affixed to the top of one of said walls for receiving ballast to overweight said dock along the side bearing said wall, and outside bulkheads mounted upon the inboard face of said wall at the ends thereof, extending from the deck towards said extension and preventing flooding of said wall along its inboard face when the dock is in careened position, said dock having bracing beams secured to said wall and the deck, and tension rods between the inboard and outboard faces of said wall, and between the deck and the hull near the corners of the bottom.

References Cited in the file of this patent

UNITED STATES PATENTS

| | | |
|---|---|---|
| 755,854 | Dieckhoff | Mar. 29, 1904 |
| 1,486,257 | Muller | Mar. 11, 1924 |
| 2,576,928 | Engstrand | Dec. 4, 1951 |

FOREIGN PATENTS

| | | |
|---|---|---|
| 393,111 | Germany | Apr. 4, 1924 |